June 22, 1943.  E. W. REMBERT  2,322,592
ASBESTOS-CEMENT PIPE
Filed May 29, 1941
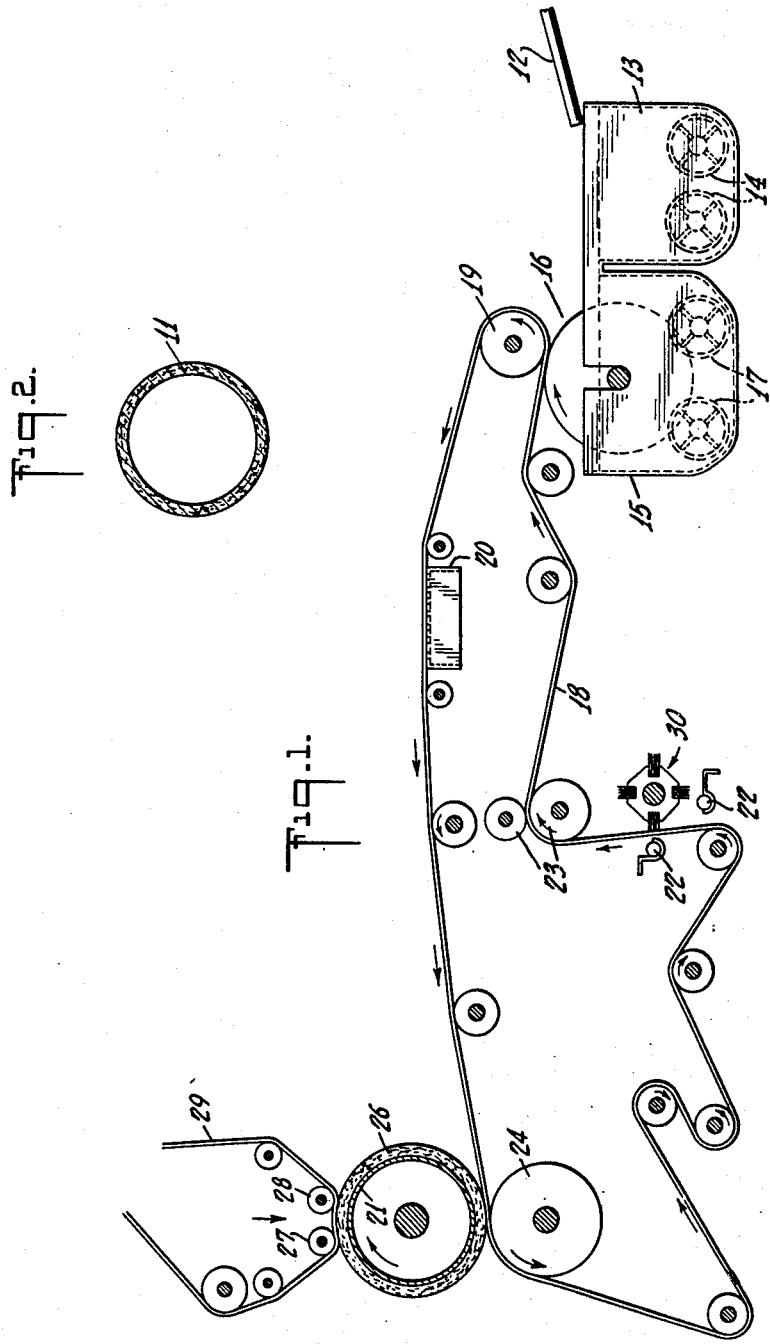
INVENTOR.
ERNEST WAYNE REMBERT.
BY Virgil C. Kline
ATTORNEY Patented June 22, 1943

2,322,592

UNITED STATES PATENT OFFICE 2,322,592

ASBESTOS-CEMENT PIPE

Ernest Wayne Rembert, Plainfield, N. J., assignor to Johns-Manville Corporation, New York, N. Y., a corporation of New York Application May 29, 1941, Serial No. 395,712

2 Claims. (Cl. 138—86)

This invention relates to asbestos and cement pipe and the method of making the same, and is a continuation-in-part application of co-pending application, Serial No. 131,585, filed March 18, 1937, now United States Patent No. 2,246,537, dated June 24, 1941.

Asbestos and cement pipes are in wide use for water lines or the like. Such pipes are made in satisfactory manner by suspending asbestos fibres and Portland cement in a large volume of water, forming the suspended materials into a web or thin sheet on a screen-faced cylinder mold, transferring the sheet to a cloth belt conveyor, transferring the sheet from the cloth to a mandrel, there winding the web upon itself, to form a tube, and subjecting the tube during the winding to strong compression, to remove excess water and to compact and densify the pipe thus formed. When the wall of the pipe has been made of the thickness desired, the pipe is removed from the mandrel and the cement is hardened.

In making such mandrel-compressed asbestos and cement pipe, there has been used heretofore a proportion of asbestos of the order of 10 to 15 parts by weight to 100 parts of the combined dry weight of asbestos and Portland cement.

It is an object of the present invention to increase the average strength of asbestos and cement pipe of given wall thickness or conversely to decrease the wall thickness and weight of pipe required for a given strength. Other objects and advantages will appear from the detailed description that follows.

The invention comprises the hereinafter described novel features of the asbestos and cement pipe and the method of making it. More particularly, the invention comprises the method of making an asbestos and cement pipe which includes forming upon a mandrel a wet asbestos and cement tube of abnormally high proportion of asbestos fibres, at a pressure substantially in excess of that heretofore used.

A preferred embodiment of my product and method will be described in connection with the attached drawing, to which reference is made.

Fig. 1 shows a diagrammatic side elevation of a suitable machine for use in practising the invention.

Fig. 2 shows a cross sectional view of the improved pipe.

In making the pipe 11, there is first formed an aqueous suspension of 20 to 25 parts by weight of the selected asbestos fibres of kind to be later described and 75 to 80 parts of Portland cement in a large volume of water, say, 2,500 to 5,000 parts. This suspension is then transferred, as by the pipe 12, to the leveling vat 13 provided with agitators 14. In this vat there is maintained a small supply of the suspended asbestos and cement mixture which is passed, as used, into the cylinder mold vat 15. The cylinder mold vat contains the cylinder mold 16 and agitators 17. Water passes through the facing wire on the cylinder mold, thus causing the deposition of a thin wet sheet or felt of solid material on this wire. This felt is continuously transferred from the wire to an endless belt 18 at the zone of contact, under the couch roll 19. The sheet on the belt then passes continuously over a suction box 20, through which a large portion of the water in the sheet is removed, and then to the press section of the machine. Here the felt is transferred from the belt to the forming mandrel 21. It is there spirally wrapped and composited under pressure with previously applied turns of the felt, to form the tube 26.

The belt, after losing the sheet to the mandrel, as described, then returns, over several tension and guide rolls, past washers 22 and beater 30, and between the wringer rolls 23, to the cylinder mold. There the belt again picks up a thin felt of the wet asbestos and cement mixture.

The press section of the machine includes a heavy bottom press roll 24 on which the forming mandrel rests during the formation of the pipe or tube 26. Acting upon the pipe on the mandrel are two smaller top press rolls 27 and 28 which are rotatably mounted in a frame (not shown) that is forced downwardly by the hydraulic pressure. These rolls are permitted to rise as the thickness of the pipe increases, the pressure on the rolls being controlled by means of an automatic relief valve on the hydraulic medium. An endless belt 29 travels around the two top press rolls and loops over a sufficient number of guide and tension rolls to permit satisfactory manipulation and intermittent cleaning.

After the pipe 26 has been built up to the desired thicknes of wall, the machine is stopped, a thin-pointed tool is inserted between the inside surface of the pipe and the surface of the forming mandrel, at each end thereof, the tool is withdrawn, the machine started, and the mandrel and pipe supported thereon are rotated several times to loosen the pipe over the entire length of the mandrel. The pressure is then released on the rolls 27 and 28, they are raised from position, the mandrel carrying the pipe is taken out of position, as by being lifted from its supports at either end or by being swung on the support at one end, as a pivot, and the pipe subsequently slipped from the mandrel.

The pipe is maintained in a suitable cradle and the Portland cement therein is hardened.

Parts of the machine that are not illustrated are conventional.

Suitably, the suspension of asbestos fibres and Portland cement that has been described includes also admixed silica. Thus, I have used to advantage 30 to 100 parts of a relatively clean and sharp sand or fine silica to 100 parts of Portland cement.

When there is used the admixed silica, then the Portland cement in the pipe is cured by being subjected to steam at superatmospheric pressure, as, for example, at 70 to 120 pounds gage pressure per square inch. Under such conditions there is presumably conversion of the basic ingredients of the Portland cement to monosilicates. The proportion of the admixed silica should be adequate theoretically, along with the silica originally used in the manufacture of the Portland cement to convert the basic ingredients thereof substantially completely to monosilicates. Proportions of admixed silica in excess of 100 parts should be avoided.

In the process described, a substantial part of the several substances used in making the pipe, namely, asbestos, Portland cement, and sand, if the latter is used, pass through the facing wire on the cylinder mold 16 and to a saveall tank (not shown). This material from the saveall tank is returned to the vat 13 and there used to supply water and the said substances, the proportion of such substances returned from the saveall to the total used being sometimes as high as one-half to three-quarters of the total.

With the reuse of such saveall material there is introduced into the pipe making machine asbestos fibres and Portland cement and sometimes also sand that have previously been maintained in wet condition for various periods of time, say, on the average, for about 4 hours or so, this limited but substantial period of time being adequate to give only incipient hydration of the Portland cement. This hydration, however, is sufficient to cause increased flowability of the stock as wound upon the mandrel 21, the effect of which increased flowability is corrected effectively by the negligible hydration of the Portland cement and asbestos fibres added to the process in dry form, at the time they reach the winding step.

In making the asbestos and cement pipe, I use a relatively harsh, freely filtering fibre, such, for example, as crocidolite, Rhodesian chrysotile, Vimy Ridge (Canada) chrysotile, and/or Russian chrysotile. Such fibres may be used alone or in blends which may contain a limited proportion of less harsh chrysotile from Asbestos, Canada, say, preferably in amount not exceeding substantially that of the selected harsh fibre. The ratio of asbestos fibres to Portland cement may be varied over a relatively wide range in manufacturing asbestos-cement pipes. However, in order to obtain the beneficial results as described herein it is preferable that the asbestos fibre to Portland cement ratio be maintained within the range of 20–40 parts by weight of asbestos fibres to 100 parts dry weight of the combined asbestos fibres and Portland cement.

There have been used, in making asbestos and cement pipe by the present method, relatively long fibres that, in the Quebec standard screen test, are rated 0—12—3—1, these figures referring, respectively, to the number of ounces retained from a 16-ounce sample on approximately 2-mesh, 4-mesh, and 10-mesh screens and the pan below the 10-mesh screen, in the standard test. Somewhat shorter fibres may be used when the maximum strength is not required.

In compressing the wet asbestos-cement tube, as it is being wound spirally upon itself on the forming mandrel 17, there is used a pressure substantially higher, as, for instance, about 50% to 100% higher than that heretofore used in making the same pipe sizes. Because of the impossibility of stating exactly the pressure per square inch that is applied to unit area of the stock being wound on itself, the following data from commercial operations are given to illustrate the meaning of "abnormally high pressure" or "pressure substantially greater than that heretofore used."

When forming pipe approximately thirteen feet long, with a bottom press roll of 25.5 inches diameter and two upper press rolls each of 7.5 inches diameter, the said rolls and mandrel being approximately the same in length and the stock being wound completely along the mandrel except for a few inches at either end thereof, the following maximum total pressures have been used, with mandrels of the various diameters indicated.

| Diameter of mandrel, inches (inside diameter of pipe to be made) | Total machine pressure |
| --- | --- |
|  | Tons |
| 12 | 26 |
| 8 | 22 |
| 6 | 13 |
| 4 | 5 |

These maximum pressures are used initially, during the early stage of the winding operation, and are gradually decreased, say, by about 10 to 15 per cent during the winding operation.

For some purposes, the total pressures used may be less than those shown in the table by not more than 20 per cent.

With the use of such abnormally high pressures and the abnormally high proportion of 20 to 25 per cent of asbestos in the furnish to the pipe machine, I have obtained several useful results. In the first place, the finished pipe is denser, say by about 10% on the average, and, therefore, of less porous wall than the pipe heretofore made with the lower proportion of asbestos fibres and at the lower pressure. Also, the finished pipe is stronger than the pipe heretofore made. Finally, the use of the large proportion of asbestos fibres of the kind described minimizes the tendency of the stock to flow during the winding and compression step and become loose on the mandrel. In fact, it is this improvement in working properties during manufacture that makes possible the use of the abnormally high pressures without premature loosening of the wound up material from the mandrel.

The effect on density and strength of the pipe is illustrated by the following test results for typical specimens of pipe made, respectively, by my improved and by the conventional method. The pipe specimens were 8 inches in diameter and had walls 0.75 inch thick. They were made without the addition of silica. In each case there was used asbestos fibres and Portland cement, all conditions of manufacture being the same except for variation in the proportion of the fibres and total machine pressure applied during the winding of the wet sheet material into the form of a tube or a pipe. In each case, for instance, the pipe was cured under water for 10 days and then in air for 20 days before being tested and tests included a determination of the density of the wall of the pipe and the bursting strength under hydrostatic pressure. From the bursting strength the tensile strength was calculated by the modified Bernie formula.

*Effect of proportion of fibre and pressure of fabrication on properties of pipe*

| Pipe No. | Fibre, per cent of weight of mixed fibre and cement | Total machine pressure | | Properties of finished pipe | |
|---|---|---|---|---|---|
| | | Initial | Final | Bursting strength | Tensile strength |
| | | *Tons* | *Tons* | *Lbs./sq. in.* | *Lbs./sq. in.* |
| 1 | 25 | 24 | 22 | 900 | 5,000 |
| 2 | 25 | 14 | 8 | 610 | 3,250 |
| 3 | 15 | 13 | 9 | 610 | 3,250 |

The following tabulation illustrates the effect of high pressure and high fibre content upon the density of the product as compared to products manufactured under lower and equivalent fibre content and different pressures:

*Effect of proportion of fibre and pressure of fabrication on the density of the product*

| Pipe No. | Fibre, per cent of weight of mixed fibre and cement | Total machine pressure, tons | | Density, lbs. per cu. ft. | | |
|---|---|---|---|---|---|---|
| | | Initial | Final | Normal cure | Dry | Saturated |
| 1 | 25 | 24 | 22 | 125 | 109 | 142 |
| 2 | 25 | 14 | 8 | 116 | 101 | 134 |
| 3 | 15 | 13 | 9 | 124 | 109 | 141 |

The asbestos-cement pipe products manufactured with high fibre content of at least 20% based on the dry weight of the mixture and under high forming pressures, have a minimum dry density of about 108 lbs. per cubic ft. as compared to the substantially lower densities on similar products having high fibre content but formed under lower forming pressures. The minimum densities of the high fibre content product formed under high pressures will be substantially equal to the densities of the conventional products formed with low fibre content (about 15% fibres based on dry weight of mixture) and under low forming pressures.

It has been found that as a result of manufacturing asbestos-cement pipes in which the mixture contained 20–40% of fibres based on the dry weight of the mixture, and subjected to a high forming pressure in the order of the pressures described above, substantially the following minimum hydrostatic pressures (circumferential tensile strength) are obtainable on pipes of the following diameters:

| Lbs. per sq. inch | Pipe diameter |
|---|---|
| | *Inch* |
| 2,500 | 3 |
| 3,250 | 4 |
| 3,250 | 6 |
| 3,600 | 8 |
| 4,000 | 12 |
| 4,250 | Above 12 |

The above minimum circumferential tensile strengths are now used as the minimum basis for designing asbestos-cement pipes manufactured in accordance with the present invention. Heretofore, asbestos-cement pipes were designed on a much lower basis and in view thereof, the finished pipe product had much lower strength. Inasmuch as greatly increased strength is obtained in the product as a result of the present invention, applicant has been able to reduce the wall thickness of asbestos-cement pipes about 20% of the wall thickness of pipes containing approximately 15% fibre content and formed under the lower pressures referred to above.

On small sizes of pipe even greater improvement has been noted. Thus, the bursting strength in a typical run of 4-inch, thick-walled pipe was doubled by the change in pressure during manufacture and the abnormally high proportion of fibres. Proportions of the fibres from 20 to 40 per cent of the weight of the dry pipe may be used, the proportions above 25 in this range being desirable if the pressure is increased substantially above even the abnormally high pressure shown in the above table, as, for example, by 50 to 100 per cent.

In general, the pressure used with my proportion of asbestos fibres should be not substantially less than two tons for each one inch of diameter of the mandrel. On the other hand, the maximum pressure used should be below that which causes undesirable loosening of the pipe from the mandrel during the winding of the asbestos-cement sheet upon itself during the formation of the said pipe.

In order to obtain increased strength in asbestos-cement products as described, the greatest improvement can be shown through an increase in density which can be obtained through the removal of increasing quantities of water during the manufacturing process. The only way by which this may be accomplished to obtain significant improvement in strength, is through an increase in pressure under which the pipe is formed. When using an asbestos-cement furnish containing 15% asbestos fibres, the wet strength of the pipe during formation is not adequate to permit an increase in the forming pressures over those used in previously known conventional practices. In order to facilitate the use of higher forming pressures, improved wet strength of the asbestos-cement pipe can be obtained by increasing the fibre content of the furnish, that is, approximately 20–40% based on the dry weight of the mixed materials as described above. The increased fibre content at the same time provides greater reinforcement in the structure which also contributes to increased strength. However, due to the greater bulking tendency of the high fibre content it is necessary that higher forming pressures be utilized in order to obtain comparable density to that obtainable on asbestos-cement pipes previously manufactured with low fibre content, that is, approximately 15% of the dry weight of the mixture.

The details given are for the purpose of illustration, not restriction, and variations within the spirit of the invention are intended to be included in the scope of the appended claims.

I claim:

1. Pipe comprising a highly compressed hydrated asbestos and Portland cement composition in hardened condition, the proportion of asbestos being not less than 20 parts or more than 40 parts by weight to 100 parts dry weight of the asbestos and cement, and said product being characterized by a dry density of at least 108 lbs. per cubic foot.

2. Pipe comprising a highly compressed, hydrated and steam cured asbestos, Portland cement and finely divided silica composition in hardened condition, the proportion of the asbestos being not less than 20 parts or more than 40 parts by weight to 100 parts dry weight of said mixed materials and the proportion of admixed silica being not less than about 30 parts or more than 100 parts to 100 parts of the cement originally used.

ERNEST WAYNE REMBERT

CERTIFICATE OF CORRECTION.

Patent No. 2,322,592. June 22, 1943.

ERNEST WAYNE REMBERT.

It is hereby certified that error appears in the printed specification of the above numbered patent requiring correction as follows: Page 2, second column, line 38, in the table, for the numeral "5" read --9--; and that the said Letters Patent should be read with this correction therein that the same may conform to the record of the case in the Patent Office.

Signed and sealed this 24th day of August, A. D. 1943.

(Seal)

Henry Van Arsdale,
Acting Commissioner of Patents.